(12) United States Patent  
Kowalchuk

(10) Patent No.: US 8,857,353 B2
(45) Date of Patent: Oct. 14, 2014

(54) SYSTEM AND METHOD FOR CONTROLLING AIR FLOW TO A METERING SYSTEM

(75) Inventor: Trevor Lawrence Kowalchuk, Saskatoon (CA)

(73) Assignee: CNH Industrial Canada, Ltd., Saskatoon, Saskatchewan (CA)

( * ) Notice: Subject to any disclaimer, the term of this patent is extended or adjusted under 35 U.S.C. 154(b) by 593 days.

(21) Appl. No.: 13/168,721

(22) Filed: Jun. 24, 2011

(65) Prior Publication Data

US 2012/0325130 A1    Dec. 27, 2012

(51) Int. Cl.
*A01C 7/00* (2006.01)
*A01C 7/08* (2006.01)

(52) U.S. Cl.
CPC . *A01C 7/08* (2013.01); *Y10S 111/90* (2013.01)
USPC .......................................... 111/174; 111/900

(58) Field of Classification Search
USPC ...................... 111/174–176, 200, 900; 701/50
See application file for complete search history.

(56) References Cited

U.S. PATENT DOCUMENTS

| | | |
|---|---|---|
| 4,225,272 A | 9/1980 | Palmovist |
| 5,078,066 A * | 1/1992 | Lafferty ..................... 111/178 |
| 5,996,516 A | 12/1999 | Benneweis et al. |
| 6,164,222 A | 12/2000 | Mayerle et al. |
| 6,192,813 B1 * | 2/2001 | Memory et al. .............. 111/176 |
| 6,296,425 B1 * | 10/2001 | Memory et al. .............. 406/197 |
| 6,309,144 B1 | 10/2001 | Ingraham |
| 6,584,920 B1 | 7/2003 | Cresswell |
| 6,712,561 B1 | 3/2004 | Valerino, Sr. et al. |
| 6,715,638 B2 | 4/2004 | Moeks |
| 6,935,256 B1 | 8/2005 | Meyer |
| 7,450,019 B1 | 11/2008 | Spain |
| 7,565,871 B2 * | 7/2009 | Audette ........................ 111/179 |
| 2004/0079264 A1 * | 4/2004 | Mayerle et al. .............. 111/174 |
| 2009/0301366 A1 * | 12/2009 | Audette ........................... 111/8 |
| 2011/0132244 A1 * | 6/2011 | Meyer et al. .................. 111/130 |

* cited by examiner

*Primary Examiner* — Alicia Torres
(74) *Attorney, Agent, or Firm* — Rebecca L. Henkel

(57) ABSTRACT

A system and method for controlling air flow to a metering system is provided. One agricultural cart for distribution of an agricultural product in a field includes a metering system having a plurality of metering sections. At least one metering section is selectively controllable to not meter product while at least one other metering section is metering product. The agricultural cart also includes an air conveyance system having a blower and a conduit for producing and directing an air stream for moving the metered product toward a distribution device. The agricultural cart includes control circuitry configured to alter operation of the air conveyance system based upon whether the at least one metering section is metering or not metering product.

20 Claims, 6 Drawing Sheets

SYSTEM AND METHOD FOR CONTROLLING AIR FLOW TO A METERING SYSTEM

BACKGROUND

The invention relates generally to agricultural metering systems and, more particularly, to a system and method for controlling air flow to a metering system.

Generally, seeding implements are towed behind a tractor or other work vehicle. These seeding implements typically include one or more ground engaging tools or openers that form a seeding path for seed deposition into the soil. The openers are used to break the soil to enable seed deposition. After the seeds are deposited, each opener is followed by a packer wheel that packs the soil on top of the deposited seeds.

In certain configurations, an air cart is used to meter and deliver agricultural product (e.g., seeds, fertilizer, etc.) to ground engaging tools within the seeding implement. Certain air carts include a metering system and an air conveyance system configured to deliver metered quantities of product into an airflow that transfers the product to the openers. However, typical air conveyance systems have limited ability to regulate air flow based on product flow rate from the metering system. For example, certain metering systems include multiple independently controllable metering sections configured to selectively route product to various openers. In such metering systems, the flow rate of product into the airflow is dependent upon the number of metering sections in operation. Furthermore, the air conveyance system is configured to provide a sufficient airflow to ensure that product is effectively transferred to the openers when all metering sections are in operation. Unfortunately, because the air conveyance system has a limited ability to regulate airflow, an extraneous airflow will be provided when less than all of the metering sections are in operation, thereby reducing the efficiency of the air cart.

BRIEF DESCRIPTION

In one embodiment, an agricultural cart for distribution of an agricultural product in a field includes a metering system having a plurality of metering sections. At least one metering section is selectively controllable to not meter product while at least one other metering section is metering product. The agricultural cart also includes an air conveyance system having a blower and a conduit for producing and directing an air stream for moving the metered product toward a distribution device. The agricultural cart includes control circuitry configured to alter operation of the air conveyance system based upon whether the at least one metering section is metering or not metering product.

In another embodiment, an agricultural cart for distribution of an agricultural product in a field includes a metering system having a plurality of independently controllable metering sections configured to be driven to meter product and not driven to not meter product. The agricultural cart also includes an air conveyance system having multiple independently controllable dampers, a blower, and a conduit for producing and directing an air stream for moving the metered product toward a distribution device. The agricultural cart includes control circuitry configured to alter a position of each damper and to alter operation of the air conveyance system based upon the number of metering sections metering product.

In another embodiment, a method of manufacturing an agricultural cart includes coupling a plurality of independently controllable metering sections together to form a metering system. Each metering section is configured to be driven to meter product and not driven to not meter product. The method also includes coupling an air conveyance system to the metering system. The air conveyance system comprises multiple independently controllable dampers, a blower, and a conduit for producing and directing an air stream for moving the metered product toward a distribution device. The method includes coupling control circuitry to the metering system. The control circuitry is configured to alter a position of each damper and to alter operation of the air conveyance system based upon the number of metering sections metering product.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

As described in detail below, embodiments of a system and method for controlling air flow to a metering system are provided. Unlike prior air flow control systems directed toward regulating flow to separate metering systems, e.g., Benneweis et al. (U.S. Pat. No. 5,996,516), the embodiments described below pertain to controlling air flow to separate sections within a single metering system. For example, in certain embodiments, an agricultural cart configured to distribute an agricultural product in a field includes a metering system having multiple metering sections. At least one metering section is selectively controllable to not meter product while at least one other section is metering product. The agricultural cart also includes an air conveyance system having a blower and a conduit for producing and directing an airflow for moving the metered product toward a distribution device. In addition, the cart includes control circuitry configured to alter operation of the air conveyance system based upon whether the at least one metering section is metering or not metering product. In certain embodiments, the agricultural cart includes at least one damper communicatively coupled to the control circuitry. In such embodiments, the control circuitry is configured to position the damper to alter air flow through the conduit based upon whether the at least one metering section is metering or not metering product.

Figure 1:
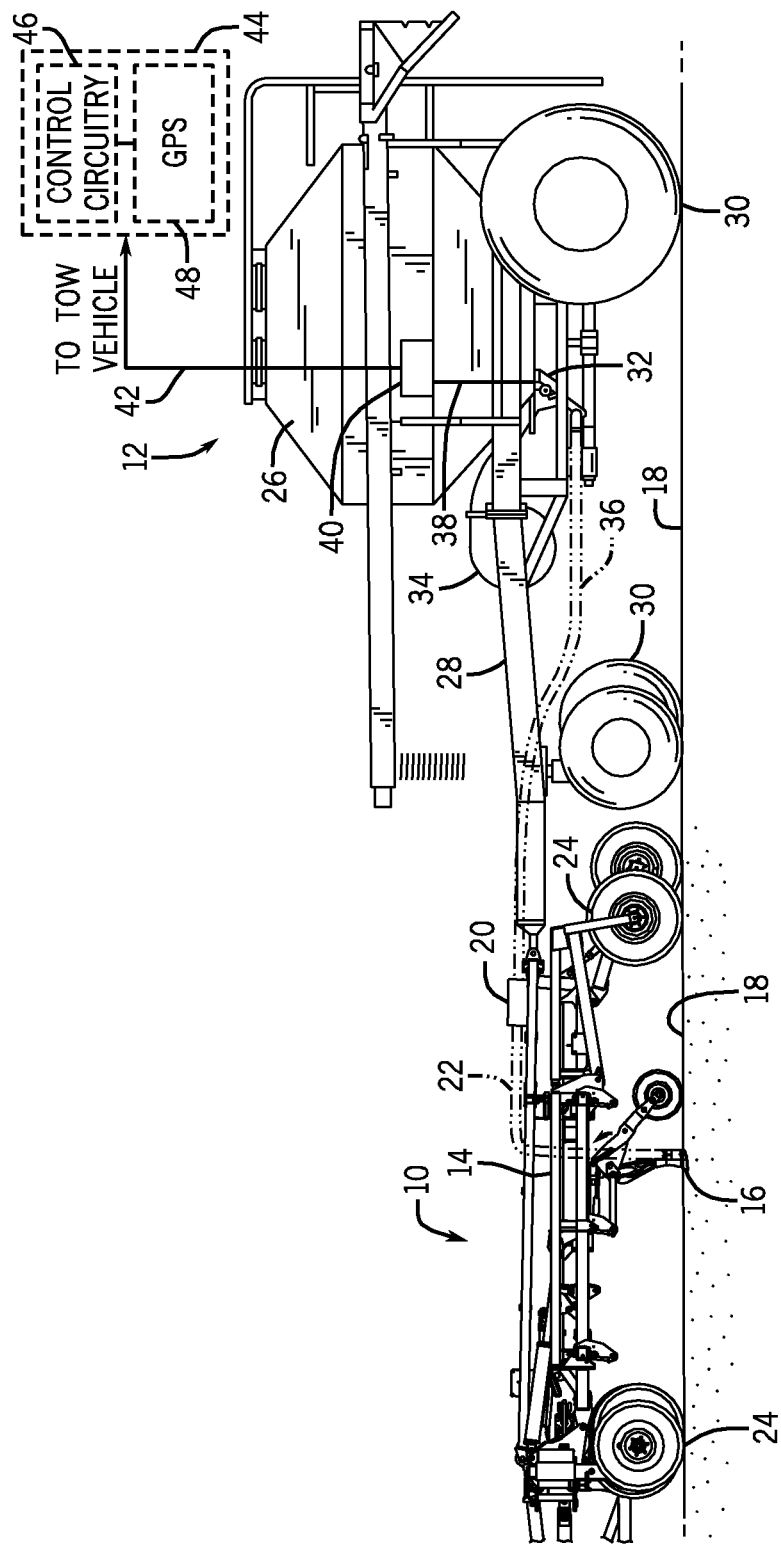
FIG. 1 is a side view of an air cart which may employ an embodiment of an air conveyance system.

FIG. 1 is a side view of an air cart, which may employ an embodiment of an air conveyance system. In the illustrated embodiment, an implement 10 is coupled to an air cart 12. The implement 10 includes a tool frame 14 having a ground engaging tool 16. The ground engaging tool 16 is configured to penetrate soil 18 for seed and/or fertilizer deposition into the soil. The ground engaging tool 16 receives product (e.g., seeds, fertilizer, etc.) from a product distribution header 20 via a hose 22. As illustrated, the hose 22 extends from the product distribution header 20 to the ground engaging tool 16 to facilitate product flow to the tool.

Although only one ground engaging tool 16, product distribution header 20, and hose 22 are included in the illustrated embodiment, it should be appreciated that the implement 10 may include additional tools 16, headers 20 and/or hoses 22 in alternative embodiments. For example, in certain embodiments, the implement 10 may include one or more distribution headers having multiple hoses extending to respective ground engaging tools 16. In the illustrated embodiment, the implement 10 includes wheel assemblies 24 which contact the soil surface 18, and support the implement 10 during operation and transport.

The air cart 12 includes a storage tank 26, a frame 28, wheels 30, a metering system 32, and an air source 34. In certain configurations, the storage tank 26 includes multiple compartments for storing various flowable particulate materials. For example, one compartment may include seeds, and another compartment may include a dry fertilizer. In such configurations, the air cart 12 is configured to deliver both the seeds and fertilizer to the implement 10. The frame 28 includes a towing hitch configured to couple to the implement 10 or a tow vehicle. As illustrated, the air cart 12 is coupled to the implement 10 via the frame 28. Consequently, the air cart 12 is towed behind the implement 10 during planting operations and during transport. In alternative embodiments, the air cart 12 may be towed directly behind a tow vehicle, with the implement 10 towed behind the air cart 12.

In the present embodiment, seeds and/or fertilizer within the storage tank 26 are gravity fed into the metering system 32. The metering system 32 includes sectioned meter rollers to regulate the flow of material from the storage tank 26 into an air flow provided by the air source 34. The air flow then carries the material through a hose 36 to the implement 10, thereby supplying the ground engagement tool 16 with seeds and/or fertilizer for deposition within the soil. Although only one hose 36 is included in the illustrated embodiment, it should be appreciated that multiple hoses may be utilized within alternative embodiments. Furthermore, the hoses 36 extending from the air cart 12 to the distribution headers 20 may have a larger diameter than the hoses extending from the distribution headers 20 to each ground engaging tool 16. For example, the hoses extending to the distribution headers may have a diameter of about 2.5 inches, while the hoses extending to each ground engaging tool 16 may have a diameter of about 1.0 inches.

In the illustrated embodiment, a communication bus 38 communicatively couples control circuitry 40 to the metering system 32 and to the air source 34. The communication bus 38 enables power and control signals to be provided to the metering system 32 and to the air source 34 to control their operation. In certain embodiments, a second communication bus 42 connects the control circuitry 40 to a control assembly 44 which may be located on the tow vehicle. The control assembly 44 includes additional control circuitry 46 and a spatial locating system, such as the illustrated Global Positioning System (GPS) receiver 48. The additional control circuitry 46 provides control signals to the control circuitry 40, and may receive geographical position information from the GPS receiver 48 to determine a geographical position of the metering system 32 or air cart 12. As such, the control circuitry 40 and/or the additional control circuitry 46 may implement "Smart Farming," in which the control circuitry controls the metering system 32 and/or an air conveyance system based on the geographical position of the metering system 32 or air cart 12.

While the control circuitry 40 is coupled to the air cart 12 in the illustrated embodiment, it should be appreciated that the control circuitry 40 may be coupled to the implement 10 and/or the tow vehicle in alternative embodiments. In addition, while the control assembly 44 is coupled to the tow vehicle in the illustrated embodiment, it should be appreciated that at least a portion of the control assembly 44 may be coupled to the implement 10 and/or the air cart 12 in alternative embodiments. For example, in certain embodiments, the GPS receiver 48 may be coupled to the implement 10, and the control circuitry 46 may be coupled to the air car 12. Furthermore, it should be appreciated that the communications buses 38 and 42 may utilize any suitable wireless or wired communication protocols, such as CAN Bus, for example.

Figure 2:
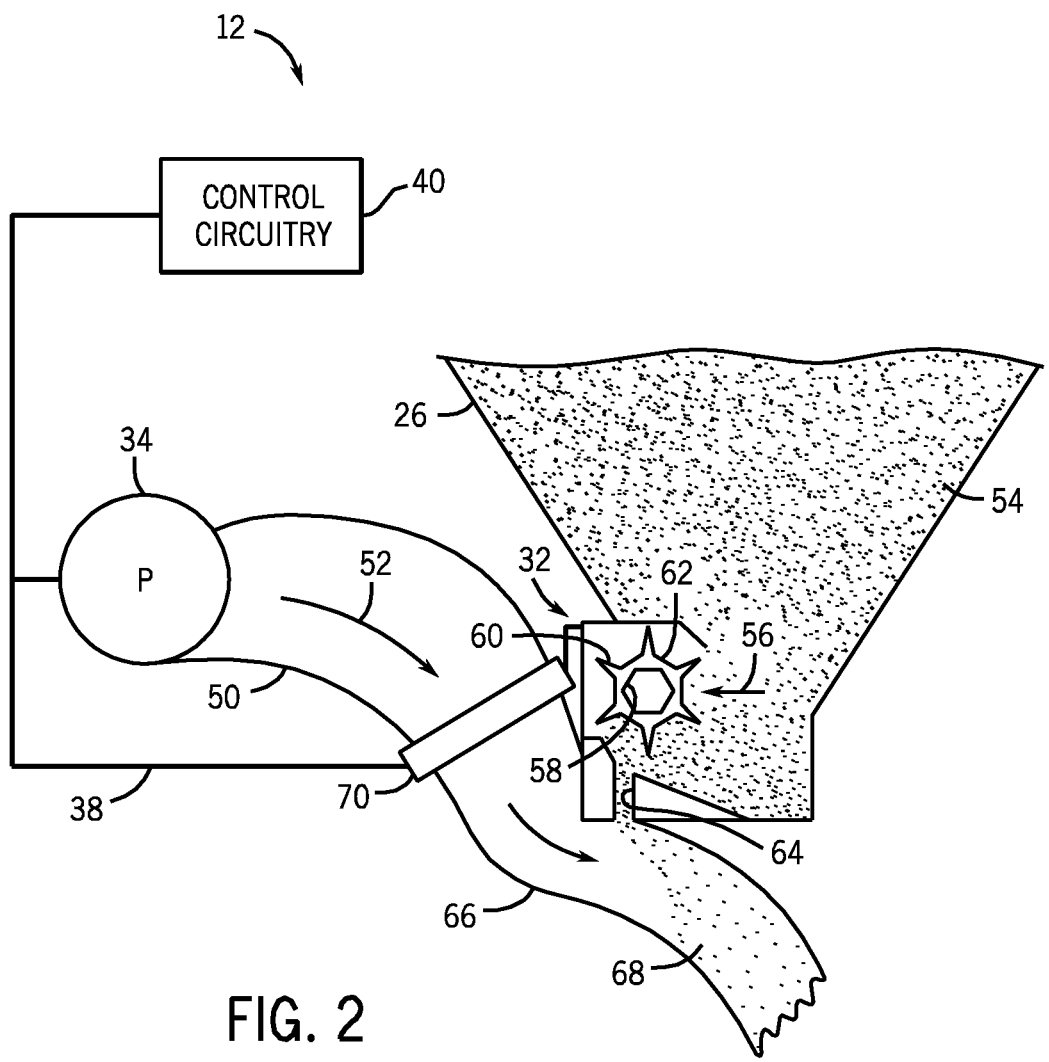
FIG. 2 is a schematic diagram of an embodiment of a metering system and an exemplary air conveyance system.

FIG. 2 is a schematic diagram of an embodiment of a metering system 32 and an exemplary air conveyance system on an air cart 12. As illustrated, the air source 34 is coupled to a tube 50 (or conduit) configured to enable air 52 to flow past the metering system 32. The air source 34 may be one or more pumps or blowers powered by electric or hydraulic motors, for example. In certain embodiments, multiple tubes may be coupled to the air source 34 and extend to different regions of the metering system. Alternatively, one tube may be coupled to the air source 34, and the tube may split into multiple tubes, each extending to a different region of the metering system. Flowable particulate material 54 (e.g., seeds, fertilizer, etc.) within the storage tank 26 flows by gravity into the metering system 32. The metering system 32 includes one or more meter rollers 56 configured to regulate the flow of material 54 into the air flow 52. More particularly, the metering system 32 may include multiple meter rollers 56 disposed adjacent to one another along a longitudinal axis of the rollers 56. For example, certain metering systems 32 include eight meter rollers 56. Such systems 32 are known as "8-run" metering assemblies. However, alternative embodiments may include more or fewer meter rollers 56, e.g., 5, 6, 7, 8, 9, or more. Further embodiments may include one continuous meter roller 56.

Each meter roller 56 includes an interior cavity 58 configured to receive a shaft that drives the meter roller 56 to rotate. In the present embodiment, the cavity 58 has a hexagonal cross section. However, alternative embodiments may include various other cavity configurations (e.g., triangular, square, keyed, splined, etc.). The shaft is coupled to a drive unit, such as an electric or hydraulic motor, configured to rotate the meter rollers 56. Alternatively, in certain embodiments, the meter rollers 56 may be coupled to an air cart wheel by a gear assembly such that rotation of the wheel drives the meter rollers 56 to rotate. Such a configuration may automatically vary the rotation rate of the meter rollers 56 based on the speed of the air cart.

Each meter roller 56 also includes multiple flutes 60 and recesses 62. The number and geometry of the flutes 60 are particularly configured to accommodate the material 54 being distributed. The illustrated embodiment includes six flutes 60 and a corresponding number of recesses 62. Alternative embodiments may include more or fewer flutes 60 and/or recesses 62. For example, the meter rollers 56 may include 2, 4, 6, 8, 10, 12, 14, 16, 18, 20, or more flutes 60 and/or recesses 62. In addition, the depth of the recesses 62 and/or the height of the flutes 60 are configured to accommodate the material 54 within the storage tank 26. For example, a meter roller 56 having deeper recesses 62 and fewer flutes 60 may be employed for larger seeds, while a meter roller 56 having shallower recesses 62 and more flutes 60 may be employed for smaller seeds. Other parameters such as flute pitch (i.e., rotation relative to a longitudinal axis) and flute angle (i.e., rotation relative to a radial axis) may also be varied in alternative embodiments.

For a particular meter roller configuration, the rotation rate of the meter roller 56 controls the flow of material 54 into the air stream 52. Specifically, as the meter roller 56 rotates, material is transferred through an opening 64 in the metering system 32 into a tube 66. The material then mixes with air from the air source 34, thereby forming an air/material mixture 68. The mixture then flows to the row units of the implement via additional tubes, where the seeds and/or fertilizer are deposited within the soil. In the present embodiment, the metering system 32 may be deactivated by stopping rotation of the meter rollers 56, thereby substantially blocking the flow of material through the opening 64. Conversely, the metering system 32 may be activated by engaging rotation of the meter rollers 56. In this manner, product flow to the row units may be suspending while the ground engaging tools are in a non-working position. Although only one tube 66 is included in the illustrated embodiment, the system may employ multiple tubes in alternative embodiments. For example, each meter roller 56 may be configured to deliver product to a respective tube. Alternatively, there may be one tube for a group of meter rollers 56. Consequently, there may be 2, 3, 4, 5, 6, 7, 8 or 9 tubes attached to the meter roller 56.

In the illustrated embodiment, one or more dampers 70 are coupled to the tubes 50 and 66. The dampers 70 may be controlled to selectively inhibit air flow 52 to one or more tubes 66. As illustrated, the dampers 70, the air source 34, and the metering system 32 are communicatively coupled to the control circuitry 40 via the communication bus 38. As such, the control circuitry 40 controls the position of the dampers 70 and the speed of the air source 34. For example, the control circuitry 40 may alter the position of the dampers 70 and the speed of the air source 34 based on whether an associated meter roller 56 is rotating, or based on a number of meter rollers 56 in operation. By way of example, to block product flow to a group of tools 16, the control circuitry 40 will stop the meter rollers 56 configured to provide product to the group. In addition, the control circuitry 40 will close the damper 70 within the tube 66 configured to deliver product to the group of tools. Due to the reduced product flow, the control circuitry 40 will also decrease the speed of the air source 34, thereby substantially reducing power usage. Because air flow is particularly adjusted to accommodate the product flow rate, the efficiency of the air cart will be significantly increased.

Although the tubes 50 and 66 are external to the metering system 32 in the illustrated embodiment, it should be appreciated that alternative embodiments may include tubes directly coupled to the metering system 32. For example, the tube 50 may couple to a top section of the metering system 32, and the tube 66 may couple to a bottom section of metering system 32. In such a configuration, the metering system 32 may have two top sections and one bottom section. The top sections may include one section for air entry and another section for product entry. The bottom section may be an exit point for the combined air and product.

Figure 3:
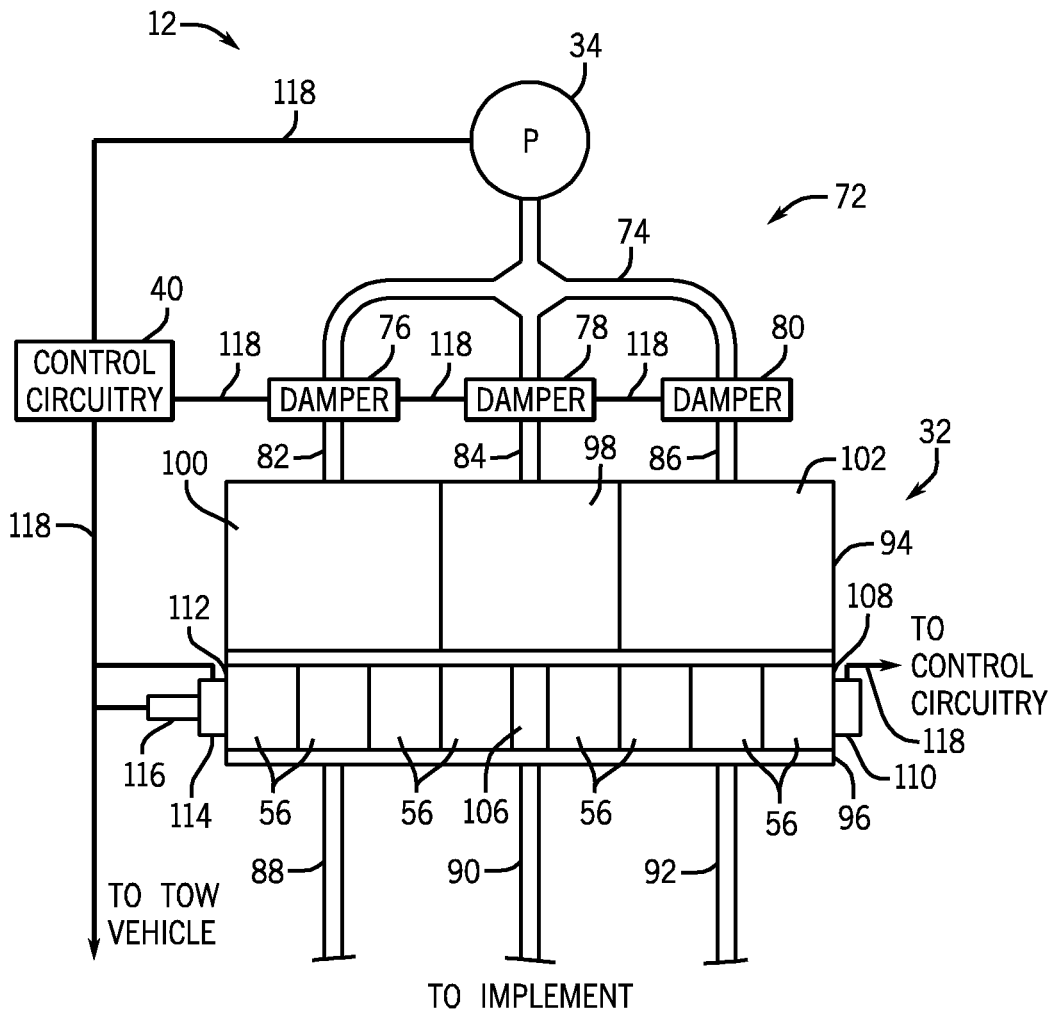
FIG. 3 is a schematic diagram of an embodiment of a metering system and an exemplary air conveyance system.

FIG. 3 is a schematic diagram of an embodiment of a metering system 32 and an air conveyance system 72. The air conveyance system 72 includes the air source 34, a tube 74, and dampers 76, 78, and 80. The tube 74 is coupled to the air source 34, and to each of the dampers 76, 78 and 80. Tubes 82, 84, and 86 extend between the dampers 76, 78 and 80 and the metering system 32, and tubes 88, 90 and 92 extend between the metering system 32 and an implement. The metering system 32 is divided into an air handling portion 94 and a metering portion 96. The air handling portion 94 and the metering portion 96 are subdivided into a center section 98 and two side sections 100 and 102. The tube 84 extends between the damper 78 and the center section 98, the tube 82 extends between the damper 76 and the side section 100, and the tube 86 extends between the damper 80 and the side section 102.

The metering portion 96 of the metering system 32 includes four meter rollers 56 connected to a first side of a coupling 106, and four meter rollers 56 connected to a second side of the coupling. At a first end 108 of the meter portion 96, a clutch 110 is coupled to a drive shaft (not shown) extending through all of the meter rollers 56, and a side hex shaft (not shown) extending through three meter rollers 56 in the side section 102. When engaged, the clutch 110 couples the drive shaft to the side hex shaft to transfer torque from the drive shaft to the side hex shaft. When disengaged, the clutch 110 decouples the drive shaft from the side hex shaft. Further, at a second end 112, a clutch 114 is coupled to the drive shaft and a side hex shaft (not shown) extending through three meter rollers 56 in side section 100. When engaged, the clutch 114 couples the drive shaft to the side hex shaft to transfer torque from the drive shaft to the side hex shaft. When disengaged, the clutch 114 decouples the drive shaft from the side hex shaft.

A drive unit 116 is coupled to the drive shaft, and configured to drive the shaft to rotate. A communication bus 118 communicatively couples the control circuitry 40 to the air source 34, to the dampers 76, 78, and 80, to the clutches 110 and 114, and to the drive unit 116. Furthermore, the communication bus 118 is communicatively coupled to a tow vehicle to facilitate control of the air cart 12 from the tow vehicle. In the present embodiment, the control circuitry 40 is configured to send control signals over the communication bus 118 to operate the air cart devices.

During operation, the drive unit 116 rotates the meter rollers 56 to meter product for distribution to an implement. In addition, the air source 34 provides an air stream through the tube 74. When the dampers 76, 78, and 80 are in an open position, the air stream passes through the dampers, through the tubes 82, 84 and 86, and into the air handling portion 94 of the metering system 32. In the air handling portion 94, the air stream from the tube 82 combines with product metered from the meter rollers 56 in the side section 100, and the air/product mixture exits the metering system 32 through the tube 88. Likewise, the air stream from the tube 84 combines with product metered from the meter rollers 56 in the center section 98, and the air/product mixture exits the metering system 32 through the tube 90. Furthermore, the air stream from the tube 86 combines with product metered from the meter rollers 56 in the side section 102, and the air/product mixture exits the metering system 32 through the tube 92.

The control circuitry 40 is configured to send a signal to cause either of the clutches 110 and 114 to disengage. When either clutch is disengaged, the control circuitry 40 may further send a signal to reduce the speed of the air source 34 and/or to close the damper 76 and 80 associated with the disengaged clutch. For example, if the clutch 110 is disengaged, the control circuitry 40 will reduce the speed of the air source 34 and may close or partially close the damper 80, thereby reducing the air flow through the side section 102. In addition, if the clutch 114 is disengaged, the control circuitry 40 will reduce the speed of the air source 34 and may close or partially close the damper 76, thereby reducing the air flow through the side section 100. Furthermore, both clutches 110 and 114 may be disengaged, and the control circuitry 40 may reduce the speed of the air source 34 and/or close the dampers 76 and 80.

The control circuitry 40 may also send a signal to cause the clutches 110 and 114 to be engaged. When either clutch is engaged, the control circuitry 40 may send a signal to increase the speed of the air source 34 and/or open the dampers 76 and 80. In addition, when the control circuitry 40 stops rotating the drive unit 116, the air source 34 may be stopped and/or the dampers 76, 78, and 80 may be placed in a closed position. In certain embodiments, the speed of the air source 34 may be reduced proportionally to the number of sections not metering product. Likewise, the dampers 76, 78, and 80 may be opened, closed, or partially opened to achieve a desired air flow through the tubes.

For example, if an operator does not want product to be delivered to a certain section of the implement, the operator may instruct the control circuitry 40 to stop the clutch 110 or 114 that corresponds to that section of the implement. The control circuitry 40 then disengages the corresponding clutch, decreases the speed of the air source 34, and closes the corresponding damper 76, 78, or 80. Thus, the overall air flow is reduced, resulting in lower energy consumption and increased efficiency in the metering system 32. In certain embodiments, the speed of the air source 34 and/or the position of the dampers 76, 78, and 80 may be altered based on a start time of each metering section 98, 100, and 102, and a stop time of each metering section 98, 100, and 102.

For example, the air source 34 may increase its speed and/or the dampers 76, 78, and 80 may open at a time prior to the start time of a metering section 98, 100, or 102. Such a time prior to the start time may be selected by an operator and may be approximately 3 to 10 seconds, or any other selectable time. Furthermore, the air source 34 may decrease its speed and/or the dampers 76, 78, and 80 may close at a time after the stop time of a metering section 98, 100, or 102. The time after the stop time may also be selected by the operator, and may be any selectable time. In other embodiments, the speed of the air source 34 may be altered based on a start time of each metering section 98, 100, and 102, and a stop time of each metering section 98, 100, and 102, while the position of the dampers 76, 78, and 80 may be altered based at least partly on the speed of the air source 34. In yet other embodiments, the position of the dampers 76, 78, and 80 may be altered based on a start time of each metering section 98, 100, and 102, and a stop time of each metering section 98, 100, and 102, while the speed of the air source 34 may be altered based on the speed of the air source 34.

Figure 4:
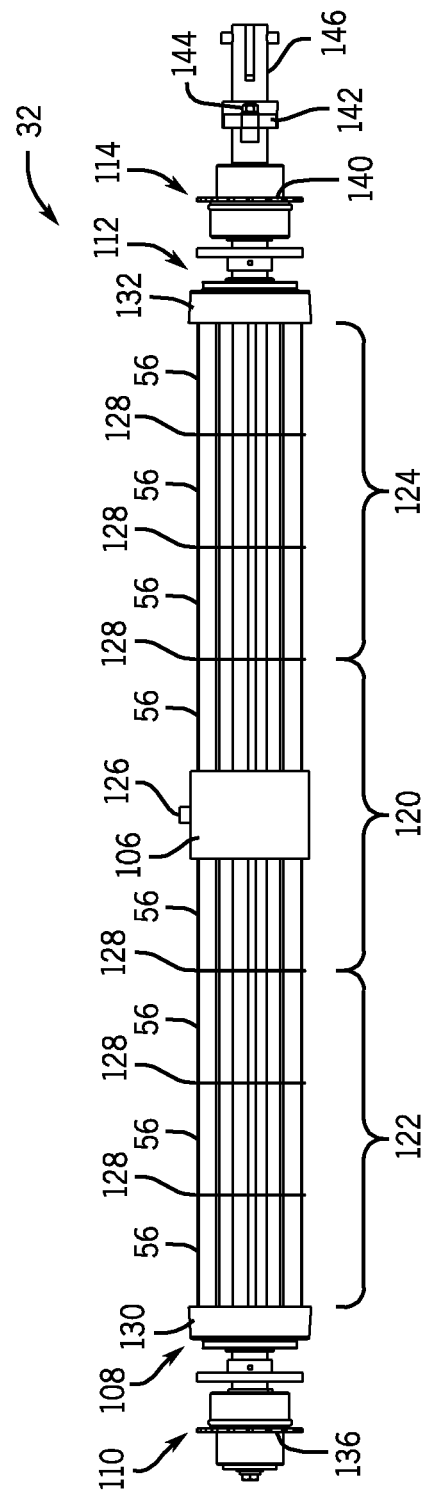
FIG. 4 is a side view of an embodiment of a sectioned metering system that may be used with an air conveyance system.

FIG. 4 is a side view of an embodiment of a sectioned meter roller assembly that may be used within the metering system 32 of FIG. 3. As illustrated, the meter roller assembly includes a center section 120, a first side section 122, and a second side section 124. In the illustrated embodiment, the center section 120 is live, i.e., directly connected to the drive shaft such that rotation of the drive shaft induces the center section 120 to rotate, and includes two meter rollers 56. However, it should be appreciated that the center section 120 may include additional meter rollers (e.g., four, six, eight, or more) in alternative embodiments. As illustrated, the center section 120 includes a coupler 106 attached to a center shaft with a fastener 126 to separate meter rollers 56 on either side of the coupler 106. The meter rollers 56 are separated from one another by divider plates 128 which direct product to the individual meter rollers 56. In the illustrated embodiment, the first and second side sections 122 and 124 each include three meter rollers 56. However, in certain embodiments, the first and second side sections 122 and 124 may include more or fewer meter rollers 56 (e.g., 1, 2, 3, 4, 5, or more). As previously discussed, during operation of the metering system 32, the meter rollers 56 are driven to rotate, thereby metering a desired quantity of product to the ground engaging tools.

A bearing assembly 130 is located at the first end 108 adjacent to the first side section 122, and a bearing assembly 132 is located at the second end 112 adjacent to the second side section 124. The clutches 110 and 114 include sprockets 136 and 140, respectively. As illustrated, an agitator drive assembly 142 is coupled to the metering system 32 adjacent to the clutch 114 via a fastener 144. In certain embodiments, the agitator drive assembly 142 is coupled to agitators configured to move back and forth when the rotary shaft is rotated, thereby dislodging product that may become stuck while flowing to the meter rollers 56. Furthermore, a coupler 146 is connected to the agitator drive assembly 142, and configured to transfer torque between a drive assembly and the drive shaft. The drive assembly may include a motor (e.g., electric, pneumatic, hydraulic, etc.) configured to drive the drive shaft to rotate, thereby rotating the meter rollers 56.

As previously discussed, rotation of the drive shaft induces the meter rollers within the center section 120 to rotate. In addition, the clutches 110 and 114 may be engaged to induce rotation of the first and second side sections 122 and 124, and disengaged to stop rotation of the first and second side sections 122 and 124. To disengage one or both of the clutches 110 and 114, a control latch is activated by a solenoid assembly (not shown) which causes the latch to catch on one of the teeth of the sprockets 136 and 140. When the latch catches on one of the teeth of either sprocket 136 or 140, the sprocket and corresponding clutch stop rotating, while the drive shaft continues to rotate. Thus, the spring holding the clutch to the drive shaft unwinds and the clutch becomes disengaged. Once the clutch is disengaged, the corresponding side section will stop rotating.

For example, if the clutch 110 is engaged and the drive shaft is rotating, the first side section 122 will rotate. Conversely, if the clutch 110 is disengaged by a latch catching on one of the teeth of the sprocket 136, the first side section 122 will not rotate despite rotation of the draft shaft (i.e., the clutch will decouple the first side section 122 from the draft shaft). However, because the center section 120 is live, the center section 120 will continue to rotate when the clutch 110 is disengaged. Likewise, if the clutch 114 is engaged and the drive shaft is rotating, the side section 124 will rotate. Conversely, if the clutch 114 is disengaged by a latch catching on one of the teeth of the sprocket 140, the side section 124 will not rotate despite rotation of the draft shaft (i.e., the clutch will decouple the side section 124 from the draft shaft). However, because the center section 120 is live, the center section 120 will continue to rotate when the clutch 114 is disengaged.

During operation, if an operator does not want product to be delivered to a certain section of the implement (e.g. the first side section 122 and the second side section 124), the operator may instruct the control circuitry to stop the clutch 110 or 114 that corresponds to that section of the implement. When a section of the implement is no longer used, the air flow needed to distribute product is reduced. Therefore, after the control circuitry disengages the corresponding clutch, the control circuitry decreases the speed of the air source, and closes the corresponding damper. Thus, the overall air flow is reduced, resulting in lower energy consumption and increased efficiency in the metering system 32.

Figure 5:
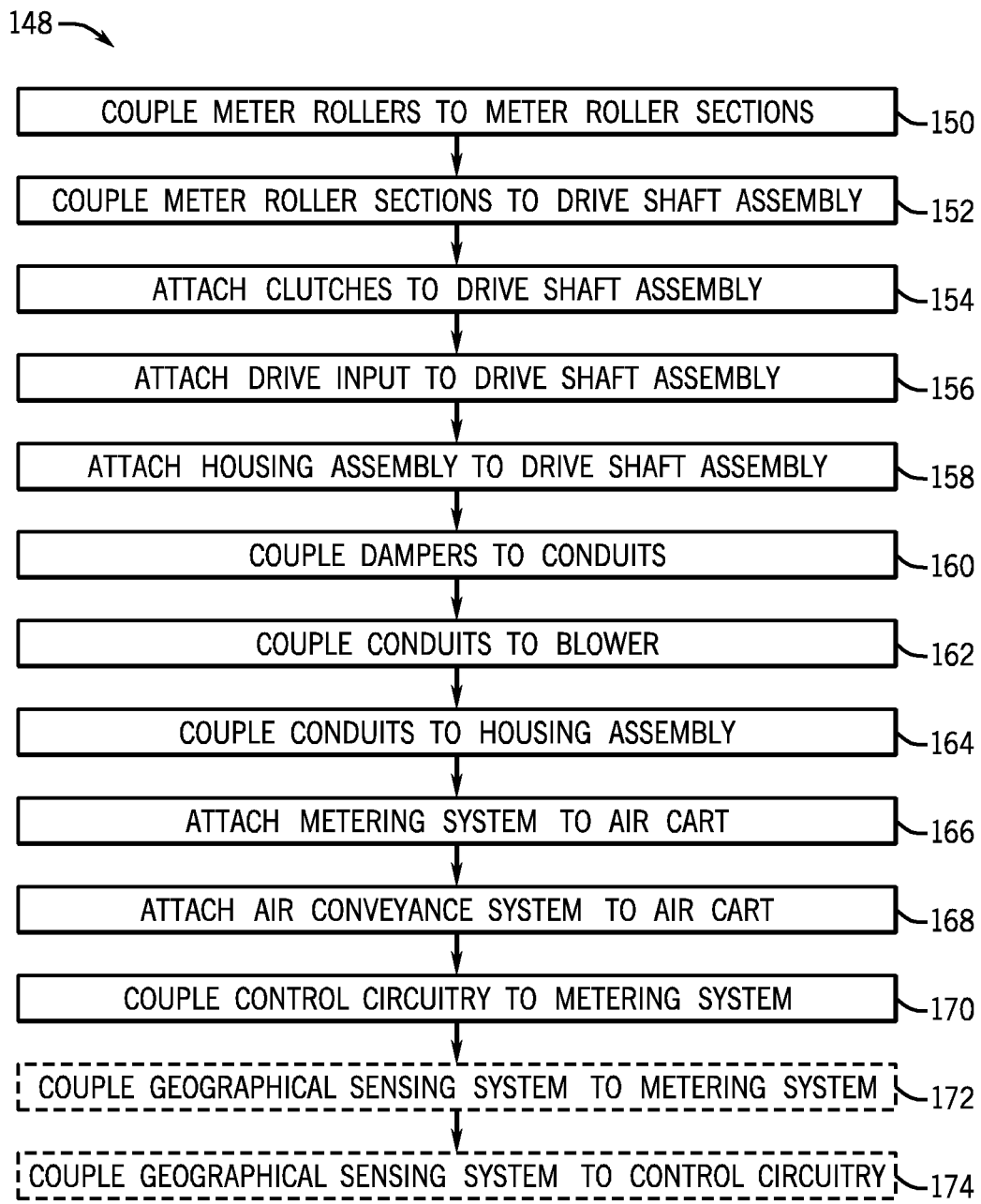
FIG. 5 is a flow diagram of an exemplary method of manufacturing a sectioned metering system with an air conveyance system.

FIG. 5 is a flow diagram of an exemplary method 148 of manufacturing a sectioned metering system with an air conveyance system. At step 150, meter rollers are coupled to meter roller sections. For example, two meter rollers may be coupled a center section, while three meter rollers may be coupled to each of a first side section and a second side section. Then, at step 152, the meter roller sections are coupled to a drive shaft assembly. For example, the center section may be secured to the drive shaft assembly, the first side section may be coupled on one side of the center section, and the second side section coupled on the other side of the center section. Next, at step 154, clutches are attached to each side of the drive shaft assembly. Specifically, the clutches may be attached adjacent to the outer ends of the first and second side sections. At step 156, a drive input, such as a motor assembly, is attached to the drive side of the drive shaft assembly adjacent to one of the clutches. Then, at step 158, a meter box housing is attached to the drive shaft assembly. For example, the meter box housing may be attached using fasteners, clamps, or some other means.

Next, at step 160, dampers are coupled to tubes for transporting an air stream and/or a product to an implement. Specifically, one damper may be coupled to the metering system for each section (e.g., center section, first side section, and second side section). At step 162, the tubes are coupled to an air source, such as a blower. As such, air from the air source may be directed through the tubes. Then, at step 164, the tubes are coupled to a meter housing assembly. Thus, air may flow from the tubes through the meter housing assembly to direct product to flow to an implement. Next, at step 166, the metering system is attached to an air cart. For example, the metering system may be attached using fasteners, or by some other manner.

At step 168, the air conveyance system, including the tubes, blower, and dampers, is attached to the air cart. Therefore, the air cart includes the air conveyance system for directing product flow to an implement. Then, at step 170, control circuitry is coupled to the metering system. For example, a wiring system may communicatively couple the blower, dampers, clutches, and drive unit to control circuitry. Next, at step 172, a spatial locating system (e.g., a geographical sensing system) may be coupled to the metering system. In certain embodiments, the spatial locating system may be attached to the air cart, while, in other embodiments, the spatial locating system may be attached to a tow vehicle. At step 174, the spatial locating system may be coupled to the control circuitry. With the spatial locating system coupled to the control circuitry, the air cart may use GPS to control which sections of the meter roller assembly meter product, and which dampers allow air to flow to the meter roller sections. Thus, the control circuitry may use the GPS to implement smart fanning. For example, based on a geographic position, the control circuitry may determine that the first side section and the center section should be activated. Therefore, the second side section may be deactivated (e.g., clutch disengaged and damper closed) while the center section and first side section remain activated.

Figure 6:
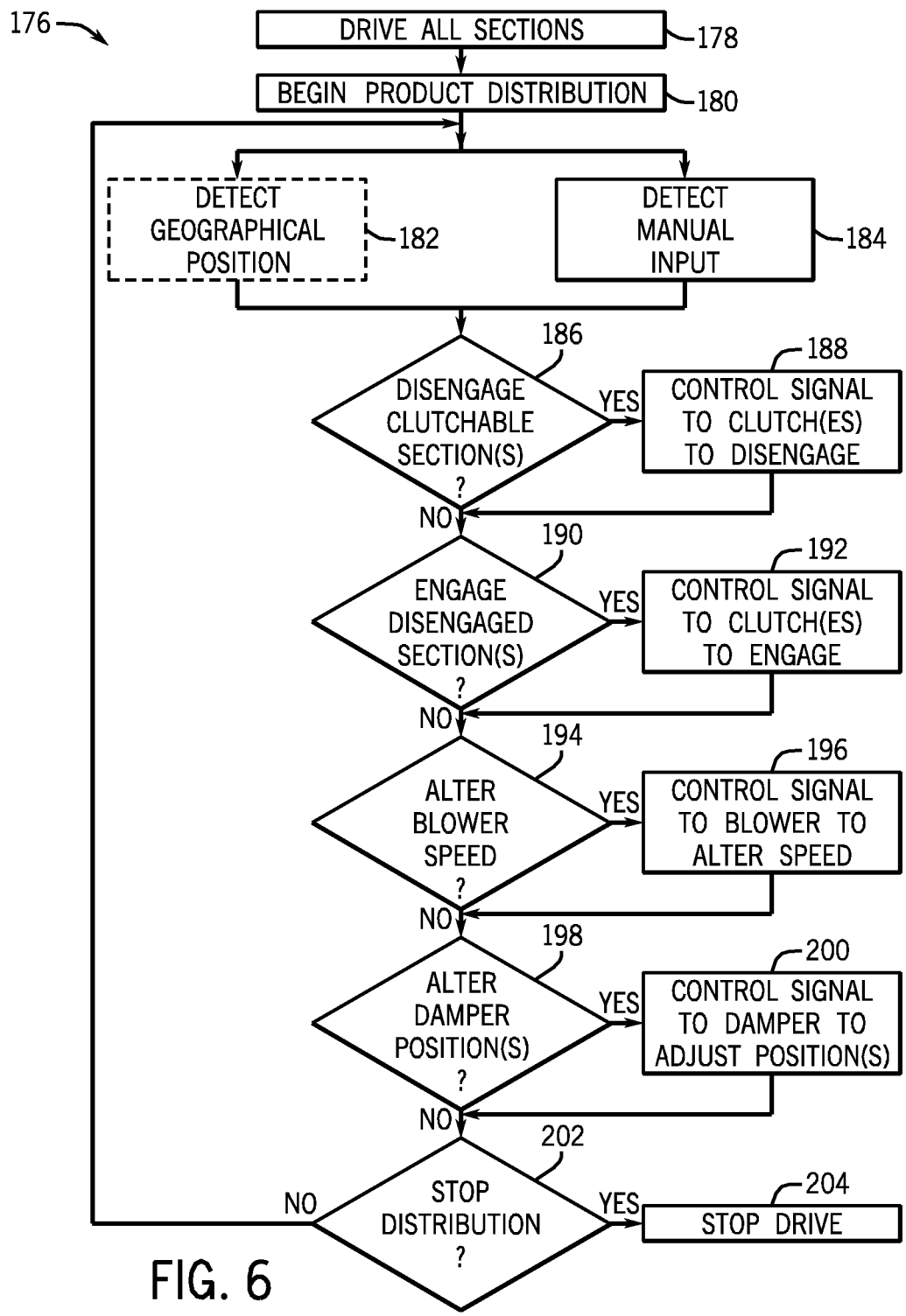
FIG. 6 is a flow diagram of an exemplary method of operating a sectioned metering system with an air conveyance system.

FIG. 6 is a flow diagram of an exemplary method 176 of operating a sectioned metering system with an air conveyance system. At step 178, all sections of the metering system are driven by a drive input, such as a drive motor assembly. Then, at step 180, as the meter roller sections are driven to rotate, the metering system begins product distribution to the implement. From step 180, the method may either continue to step 182 or step 184. At step 182, a spatial locating system may detect a geographical position of the metering system. A control system may then determine whether product should be deposited at the detected geographical position. Alternatively, at step 184, the metering system may detect a manual input from an operator, such as a selection via a user interface to engage or disengage a section of the meter roller assembly.

Next, at step 186, the control system determines whether it should disengage clutchable section(s).

If the control system determines that certain clutchable section(s) should be disengaged, the control system will send a control signal to the clutch(es) to disengage the clutch(es), as represented by step 188. For example, if an operator or a control system desires to disengage the clutch of a first side section, the control system will send a control signal to a solenoid to cause the clutch of the first side section to disengage. Next, at step 190, the system determines whether it should engage disengaged section(s). If the control system determines that certain clutchable section(s) should be engaged, the system will send a control signal to the clutch (es) to engage the clutch(es), as represented by step 192. For example, if an operator or a control system desires to engage the clutches of two side sections, the control system will send control signals to solenoids to cause the clutches of the two side sections to engage.

At step 194, the system determines whether it should alter a speed of the blower based on the number of metering sections in operation. If a change in blower speed is desired, the system sends a control signal to the blower to alter the blower speed, as represented by step 196. For example, the blower speed may be increased or decreased to correlate with clutch engagement/disengagement. Furthermore, the blower speed may be controlled by the geographical position of the air cart. Specifically, if the control circuitry determines that product should not be delivered by the blower, the control circuitry may decrease the blower speed as needed. Then, at step 198, the system determines whether it should alter damper positions based on the metering sections in operation. If an altered damper positions is desired, the system sends a control signal to the dampers to alter the damper positions, as represented by step 200. For example, the dampers may be opened, closed, or placed in an intermediate position based on a desired air flow to a respective metering section. Again, based on the geographical position of the air cart, the control circuitry may determine that product should not be delivered and the control circuitry may adjust the appropriate dampers accordingly. Next, at step 202, the system determines whether it should stop distribution of product. If product distribution should continue, the method returns to either step 182 or 184. If termination of product distribution is desired, the system will stop driving the sections at step 204.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. An agricultural cart for distribution of an agricultural product in a field, comprising:
   a metering system comprising a plurality of metering sections, wherein at least one metering section is selectively controllable to not meter product while at least one other metering section is metering product;
   an air conveyance system comprising a blower and a conduit for producing and directing an air stream for moving the metered product toward a distribution device; and
   control circuitry configured to alter operation of the air conveyance system based upon whether the at least one metering section is metering or not metering product.

2. The agricultural cart of claim 1, wherein the control circuitry is configured to alter a drive speed of the blower based upon whether the at least one metering section is metering or not metering product.

3. The agricultural cart of claim 1, wherein the control circuitry is configured to slow the drive speed of the blower when the at least one metering section is not metering product.

4. The agricultural cart of claim 1, wherein the air conveyance system comprises at least one damper, and wherein the control circuitry is configured to position the damper to alter air flow through the conduit based upon whether the at least one metering section is metering or not metering product.

5. The agricultural cart of claim 4, wherein the control circuitry is configured to close the damper to reduce air flow through the conduit when the at least one metering section is not metering product.

6. The agricultural cart of claim 1, wherein the metering system comprises multiple independently controllable metering sections, and each metering section is configured to be driven to meter product and not driven to not meter product.

7. The agricultural cart of claim 6, wherein the control circuitry is configured to alter operation of the air conveyance system to multiple discrete operating points based upon the number of metering sections metering product.

8. The agricultural cart of claim 6, wherein the air conveyance system comprises multiple independently controllable dampers, and wherein the control circuitry is configured to alter a position of each damper based upon the number of metering sections metering product.

9. The agricultural cart of claim 1, wherein the metering system is configured to cooperate with a spatial locating system communicatively coupled to the metering system to alter the number of metering sections metering product based upon a geographical position of the agricultural cart.

10. The agricultural cart of claim 9, wherein the spatial locating system is communicatively coupled to the control circuitry and configured to cooperate with the control circuitry to alter the operation of the air conveyance system based upon the geographical position of the agricultural cart.

11. The agricultural cart of claim 9, wherein the spatial locating system comprises a Global Positioning System receiver.

12. An agricultural cart for distribution of an agricultural product in a field, comprising:
a metering system comprising a plurality of independently controllable metering sections configured to be driven to meter product and not driven to not meter product;
an air conveyance system comprising multiple independently controllable dampers, a blower, and a conduit for producing and directing an air stream for moving the metered product toward a distribution device; and
control circuitry configured to alter operation of the air conveyance system based upon the number of metering sections metering product.

13. The agricultural cart of claim 12, wherein the control circuitry is configured to alter a drive speed of the blower based upon a start time of each metering section, a stop time of each metering section, or a combination thereof.

14. The agricultural cart of claim 12, wherein the control circuitry is configured to alter the position of each damper based upon a start time of each metering section, a stop time of each metering section, or a combination thereof.

15. The agricultural cart of claim 13, wherein the metering system is configured to cooperate with a spatial locating system communicatively coupled to the metering system to alter the number of metering sections metering product based upon a geographical position of the agricultural cart.

16. The agricultural cart of claim 15, wherein the spatial locating system comprises a Global Positioning System receiver.

17. A method of manufacturing an agricultural cart, comprising:
coupling a plurality of independently controllable metering sections together to form a metering system, wherein each metering section is configured to be driven to meter product and not driven to not meter product;
coupling an air conveyance system to the metering system, wherein the air conveyance system comprises multiple independently controllable dampers, a blower, and a conduit for producing and directing an air stream for moving the metered product toward a distribution device; and
coupling control circuitry to the metering system, wherein the control circuitry is configured to alter operation of the air conveyance system based upon the number of metering sections metering product.

18. The method of claim 17, comprising communicatively coupling a spatial locating system to the metering system, wherein the spatial locating system is configured to cooperate with the metering system to alter the number of metering sections metering product based upon a geographical position of the agricultural cart.

19. The method of claim 18, comprising communicatively coupling the spatial locating system to the control circuitry, wherein the spatial locating system is configured to cooperate with the control circuitry to alter the operation of the air conveyance system based upon the geographical position of the agricultural cart.

20. The method of claim 17, comprising coupling the metering system to the agricultural cart.

* * * * *